United States Patent
Cox et al.

(10) Patent No.: US 9,470,603 B2
(45) Date of Patent: Oct. 18, 2016

(54) MORPHING CERAMIC COMPOSITE COMPONENTS FOR HYPERSONIC WIND TUNNEL

(71) Applicant: Teledyne Scientific & Imaging, LLC, Thousand Oaks, CA (US)

(72) Inventors: Brian N. Cox, Sherman Oaks, CA (US); David B. Marshall, Thousand Oaks, CA (US); Sergio L. dos Santos e Lucato, Thousand Oaks, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 363 days.

(21) Appl. No.: 14/262,358

(22) Filed: Apr. 25, 2014

(65) Prior Publication Data
US 2015/0308922 A1    Oct. 29, 2015

(51) Int. Cl.
| | |
|---|---|
| *G01M 9/02* | (2006.01) |
| *B32B 3/04* | (2006.01) |
| *B32B 18/00* | (2006.01) |
| *G01M 9/04* | (2006.01) |
| *B32B 19/02* | (2006.01) |
| *B28B 1/00* | (2006.01) |

(52) U.S. Cl.
CPC ............... *G01M 9/04* (2013.01); *B28B 1/002* (2013.01); *B32B 19/02* (2013.01)

(58) Field of Classification Search
None
See application file for complete search history.

(56) References Cited

U.S. PATENT DOCUMENTS

| | | | | |
|---|---|---|---|---|
| 5,330,849 A | * | 7/1994 | Kennedy | B32B 18/00 252/389.31 |
| 5,580,643 A | * | 12/1996 | Kennedy | C04B 35/62852 428/212 |
| 5,589,115 A | * | 12/1996 | Sherwood | B32B 18/00 156/89.26 |
| 5,682,594 A | * | 10/1997 | Kennedy | B32B 18/00 428/549 |
| 2010/0015394 A1 | * | 1/2010 | Morrison | B28B 1/002 428/137 |
| 2012/0163986 A1 | * | 6/2012 | Darkins, Jr. | F01D 5/282 416/241 B |
| 2012/0164430 A1 | * | 6/2012 | Thebault | C04B 35/6286 428/293.4 |
| 2013/0251939 A1 | * | 9/2013 | Kleinow | B32B 18/00 428/121 |
| 2014/0050893 A1 | * | 2/2014 | Paige | F01D 5/28 428/158 |
| 2016/0136925 A1 | * | 5/2016 | Chamberlain | B32B 5/022 428/113 |

* cited by examiner

*Primary Examiner* — Andre Allen
(74) *Attorney, Agent, or Firm* — K&L Gates LLP

(57) ABSTRACT

In one embodiment, a morphable composite three-dimensional structure is disclosed. The morphable composite three-dimensional structure comprises a flexible fiber-reinforced ceramic composite comprising a fiber preform and a ceramic matrix material infused therein. The flexible fiber-reinforced ceramic composite defines a flowpath having a three-dimensional cross-section. The cross-section of the flowpath is variable along the length of the flowpath. A plurality of anchors are integrally formed in the fiber preform. The plurality of anchors extend through a thickness of the ceramic matrix. The plurality of anchors are configured to couple to at least one actuator. The at least one actuator is actuatable to vary the three-dimensional cross-section of the flowpath.

22 Claims, 19 Drawing Sheets

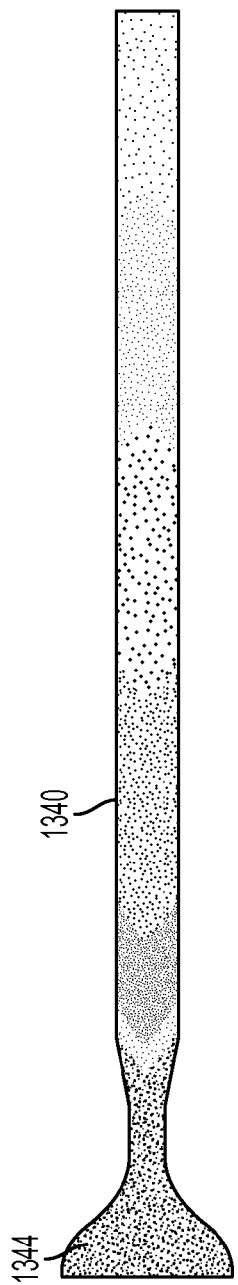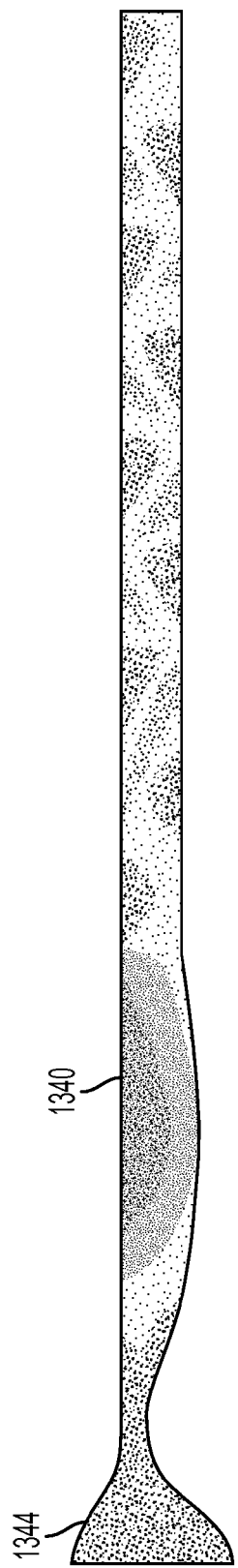

MORPHING CERAMIC COMPOSITE COMPONENTS FOR HYPERSONIC WIND TUNNEL

BACKGROUND

Ground Test facilities that can operate with Mach numbers changing continuously within a predetermined range are critical for the development of supersonic and hypersonic engine and vehicle technologies. A Mach range of 3-8, for example, covers a transition from turbine engines to ramjet engines (Mach 3-4), and from ramjet engines to scramjet engines (Mach 5-6). A continuously changing Mach range also produces changes in shock angle. Current ground-based testing facilities are unable to efficiently produce continuous testing over predetermined Mach ranges.

The majority of current ground-testing facilities operate at a fixed Mach number. Ground testing facilities utilizing rectangular geometries with flat plates configured to rotate around fixed locations have been proposed. However, flat plates require problematic sliding seals to contain extremely hot flow path gases and can only produce rectangular flow paths. The shape restrictions of rectangular flow paths precludes achieving optimally conditioned flow over the entire predetermined Mach range.

SUMMARY

In one embodiment, a morphable composite three-dimensional structure is disclosed. The morphable composite three-dimensional structure comprises a flexible fiber-reinforced ceramic composite comprising a fiber preform and a ceramic matrix material infused therein. The flexible fiber-reinforced ceramic composite defines a flowpath having a three-dimensional cross-section. The cross-section of the flowpath is variable along the length of the flowpath. A plurality of anchors are integrally formed in the fiber preform. The plurality of anchors extend through a thickness of the ceramic matrix. The plurality of anchors are configured to couple to at least one actuator. The at least one actuator is actuatable to vary the three-dimensional cross-section of the flowpath.

In one embodiment, an apparatus is disclosed. The apparatus comprises a morphable three-dimensional structure and at least one actuator. The morphable three-dimensional structure comprises a flexible fiber-reinforced ceramic composite comprising a fiber preform and a ceramic matrix material infused therein. The fiber-reinforced ceramic composite defines a flowpath having a cross-section. The cross-section of the flowpath is variable along the length of the flowpath. A plurality of anchors are integrally formed in the fiber preform. The plurality of anchors extend through a thickness of the ceramic matrix. At least one actuator is coupled to the plurality of anchors. The at least one actuator is actuatable to vary the three-dimensional cross-section of the flowpath.

In one embodiment, a variable speed wind tunnel is disclosed. The variable speed wind tunnel comprises an entry section configured to couple to an air source, an exit section comprising a testing section, and a morphable three-dimensional throat coupling the entry path and the exit path. The morphable three-dimensional throat is configured to provide a continuously variable air flow from the entry section to the exit section between. The morphable three-dimensional throat comprises a flexible fiber-reinforced ceramic composite comprising a fiber preform and a ceramic matrix material infused therein. The fiber-reinforced ceramic composite defines a flowpath having a three-dimensional cross-section. The cross-section of the flowpath is variable along the length of the flowpath. A plurality of anchors are integrally formed in the fiber preform. The plurality of anchors extend through a thickness of the ceramic matrix. At least one actuator is coupled to the plurality of anchors. The at least one actuator is actuatable to vary the three-dimensional cross-section of the flowpath.

DRAWINGS

The features of the various embodiments are set forth with particularity in the appended claims. The various embodiments, however, both as to organization and methods of operation, together with advantages thereof, may best be understood by reference to the following description, taken in conjunction with the accompanying drawings as follows:

FIGS. 15A and 15B illustrate a longitudinal section view of a duct of the wind tunnel of FIG. 14.

DESCRIPTION

Reference will now be made in detail to several embodiments, including embodiments showing example implementations of morphing ceramic matrix components for hypersonic wind tunnels. Wherever practicable similar or like reference numbers may be used in the figures and may indicate similar or like functionality. The figures depict example embodiments of the disclosed systems and/or methods of use for purposes of illustration only. One skilled in the art will readily recognize from the following description that alternative example embodiments of the structures and methods illustrated herein may be employed without departing from the principles described herein.

Figure 1A:
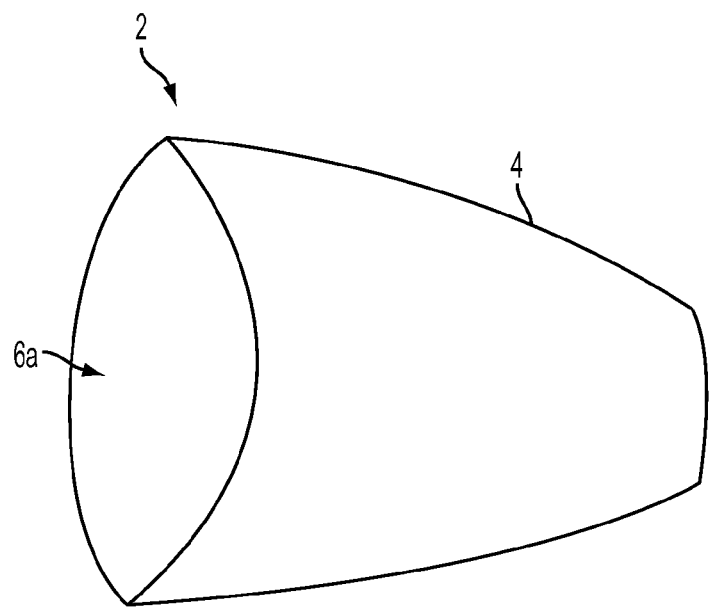
FIGS. 1A-1B illustrate one embodiment of a morphable three-dimensional structure comprising a ceramic matrix material.
Figure 1B:
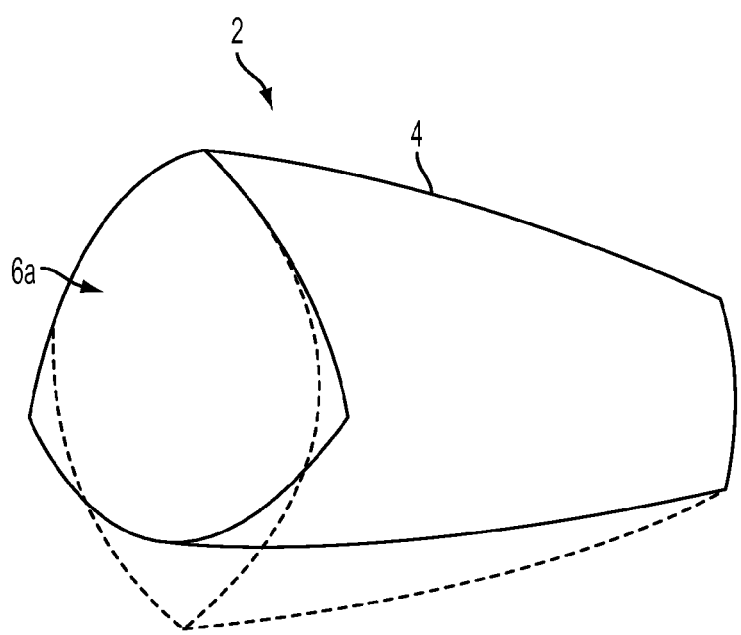

FIG. 1A illustrates one embodiment of a morphable three-dimensional structure 2. The morphable three-dimensional structure 2 defines a flowpath. The morphable three-dimensional structure 2 comprises a fiber-reinforced ceramic composite 4. The fiber-reinforced ceramic composite 4 comprises a flexible heat-resistant ceramic matrix material infiltrated within a fiber preform. The fiber preform comprises a plurality of suitable fibers, such as, for example, ceramic fibers and/or carbon fibers. The fiber-reinforced ceramic composite 4 defines the flowpath. The fiber-reinforced ceramic composite 4 is sufficiently flexible to allow the cross-section of the flowpath to be continuously varied along the length of the flowpath. One or more actuators apply a force to the morphable three-dimensional structure 2 to vary the morphable three-dimensional structure 2 and alter the cross-section of the flowpath. For example, in one embodiment, the morphable three-dimensional structure 2 is transitioned from a first cross-section 6a, illustrated in FIG. 1A, to a second cross-section 6b, illustrated in FIG. 1B. In some embodiments, the morphable three-dimensional structure 2 comprises a flowpath for receiving an air flow therethrough. Transitioning the morphable three-dimensional structure 2 from, for example, the first cross-section 6a to the second cross-section 6b modifies the air flow through the morphable three-dimensional structure 2. Although some embodiments herein are discussed with respect to a first cross-section and a second cross-section, those skilled in the art will recognize that the morphable three-dimensional structure 2 comprises a flowpath that may be continuously varied at any point along the flowpath.

In some embodiments, the morphable three-dimensional structure 2 comprises a continuous fiber-reinforced ceramic composite 4. The continuous fiber-reinforced ceramic composite 4 may comprise, for example, an elliptical shape. The continuous fiber-reinforced ceramic composite 4 may be modified by the inclusion of one or more cusp features. The one or more cusp features may define a lenticular cross-section. In some embodiments, the morphable three-dimensional structure 2 comprises one or more curved fiber-reinforced ceramic composite sheets. The one or more fiber-reinforced ceramic composite sheets define the variable cross-section of the flowpath. The one or more fiber-reinforced ceramic composite sheets are morphable to vary the cross-section of the flowpath. The one or more fiber-reinforced ceramic composite sheets may abut one or more sidewalls.

Figure 2:
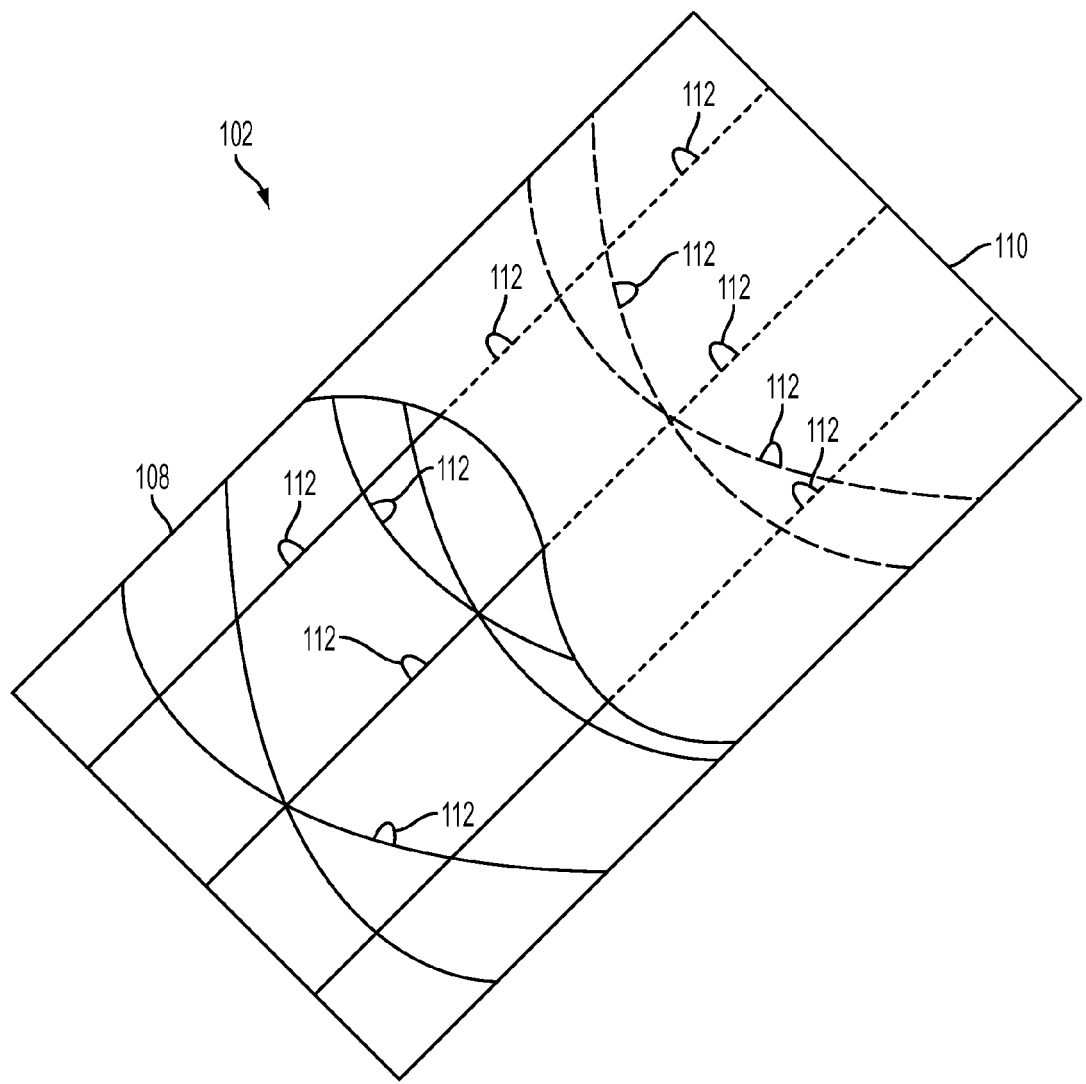
FIG. 2 illustrates one embodiment of a fiber-reinforced ceramic composite comprising a fiber preform and a ceramic matrix material.

FIG. 2 illustrates one embodiment of fiber-reinforced ceramic composite 104. The fiber-reinforced ceramic composite 104 comprises a fiber preform 108 and a ceramic matrix material 110 infused therein. The fiber preform 108 comprises a fiber mesh, or weave. The fiber preform 108 may comprise any suitable material, such as, for example, ceramic fibers, carbon fibers, and/or any other suitable material. The thickness of the ceramic matrix material 110 is selected so that the fiber-reinforced ceramic composite 104 is flexible. For example, in some embodiments, the ceramic matrix material 110 comprises a thickness of about 1.0 mm. A plurality of anchors 112 extend from, and/or are formed integrally with, the fiber preform 108. For example, in one embodiment, the anchors 112 comprise fiber loops integrally woven with the fiber preform 108. In some embodiments, one or more metal alloy anchors are integrally woven with the fiber preform 108. The plurality of anchors 112 are configured to couple to one or more actuators (see FIG. 4). The fiber-reinforced ceramic composite 104 is configured for operating uncooled at high temperatures, such as, for example, temperatures up to 1800 K, while sustaining large thermal gradients, for example, a thermal gradient of 1600 K/mm. For example, in some embodiments, the fiber preform 108 comprises silicon-carbide (SiC) fibers embedded in a SiC matrix. In some embodiments, the use of a specific ceramic matrix 110 and/or fiber preform 108, such as, for example, a fiber-reinforced ceramic composite 104 comprising SiC fibers embedded in a SiC matrix, provides a negligible porosity and a smooth finish on a flow-facing surface. In some embodiments, the fiber preform 108 and/or the ceramic matrix material 110 are modified to incorporate one or more holes and/or ducts without compromising the strength of the fiber-reinforced ceramic composite 104. Active cooling for higher temperature applications may be applied using the holes and/or ducts formed in the fiber-reinforced ceramic composite.

Figure 3:
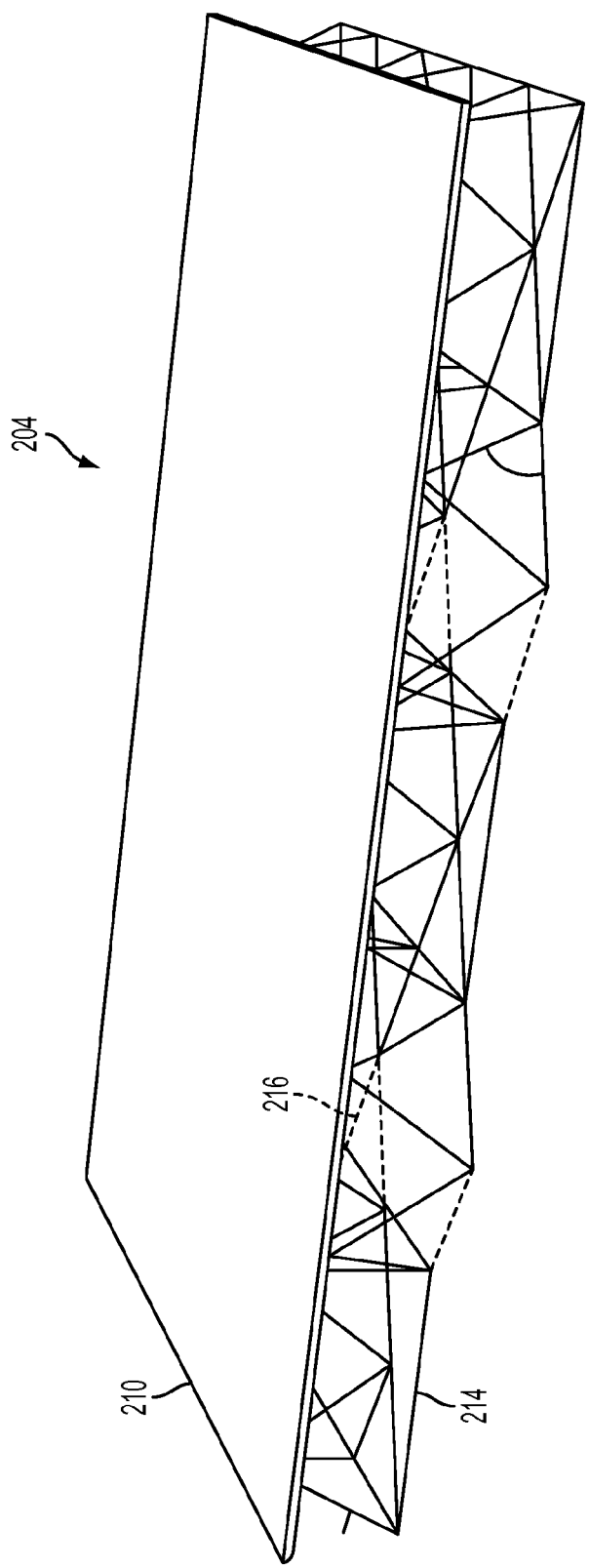
FIG. 3 illustrates a morphable fiber-reinforced ceramic composite coupled to a truss structure.

FIG. 3 illustrates one embodiment of a morphable fiber-reinforced ceramic composite 204 coupled to a truss structure 214. The fiber-reinforced ceramic composite 204 comprises a fiber preform and a flexible ceramic matrix. A truss structure 214 is coupled to the fiber-reinforced ceramic composite 204 by, for example, a plurality of anchors formed integrally with and extending from the fiber-reinforced ceramic composite 204. The truss structure 214 comprises a plurality of actuatable elements 216. The plurality of actuatable elements 216 are configured to apply a force to the morphable fiber-reinforced ceramic composite 204 to alter the cross-section of the fiber-reinforced ceramic composite 204. For example, in the illustrated embodiment, the plurality of actuatable elements 216 are configured to bend or flex the fiber-reinforced ceramic composite 204. In other embodiments comprising a morphable three-dimensional structure, such as, for example, the morphable three-dimensional structure 2 illustrated in FIGS. 1A and 1B, the plurality of actuatable elements 216 are configured to transition the fiber-reinforced ceramic composite 204 from a first cross-section to a second cross-section. The plurality of actuatable elements 216 may be configured to apply force to the fiber-reinforced ceramic composite 204 in one or more directions.

Figure 4:
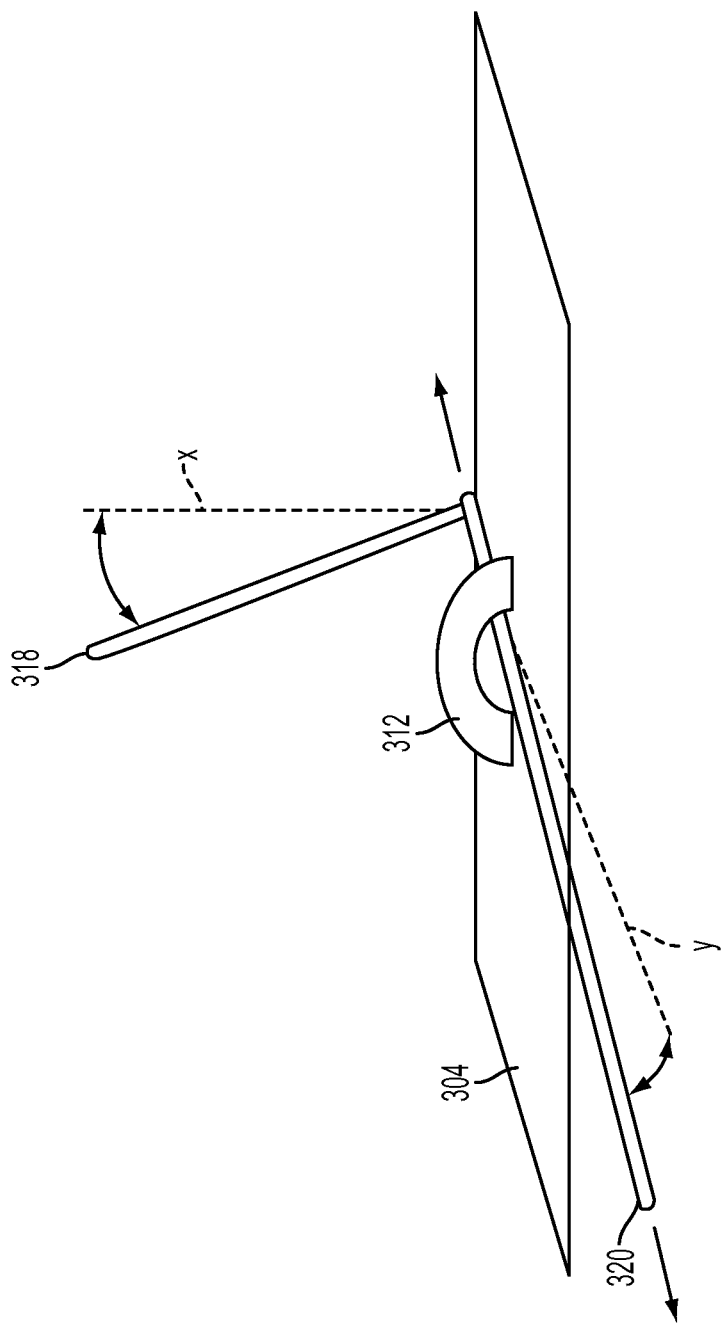
FIG. 4 illustrates one embodiment of a morphable fiber-reinforced ceramic composite coupled to a three-dimensional actuator by an anchor.

FIG. 4 illustrates one embodiment of a fiber-reinforced ceramic composite 304 comprising at least one anchor 312 coupled to an actuator 318. The flexible fiber-reinforced ceramic composite 304 comprises a fiber preform and a ceramic matrix infused therein. At least one anchor 312 is formed integrally with the fiber preform and extends from the fiber-reinforced ceramic composite 304. For example, in some embodiments, the anchor 312 comprises an alloy or ceramic eyelet integrally woven into the fiber preform and/or a fiber loop formed integrally with the fiber preform configured to receive an alloy anchor rod 320. An actuator 318 is coupled to the alloy anchor rod 320 and is configured to apply one or more forces to the fiber-reinforced ceramic composite 304. For example, in the illustrated embodiment, the actuator 318 and the alloy anchor rod 320 are configured to provide a first rotation force with respect to an X-axis, a second rotation force with respect to a Y-axis, and a sliding force along the Y-axis to the fiber-reinforced ceramic composite 304. The combination of the first rotation force, the second rotation force, and the sliding force allow the actuator 318 to change the shape of the fiber-reinforced ceramic composite 304 and therefore change a cross-section of a morphable three-dimensional structure comprising the fiber-reinforced ceramic composite 304.

Figure 5:
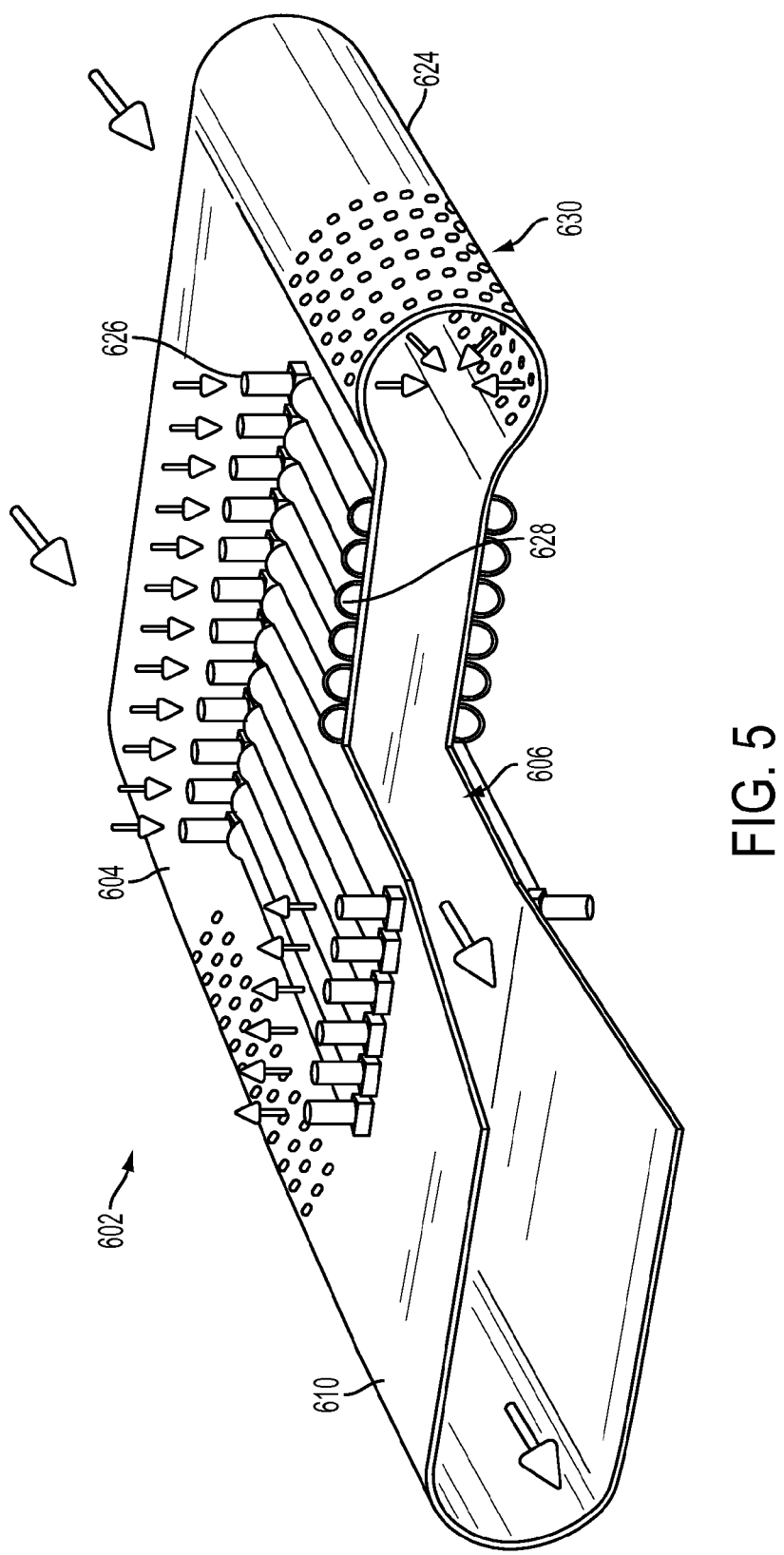
FIG. 5 illustrates one embodiment of a morphable three-dimensional structure comprising a plurality of cooling features.

FIG. 5 illustrates one embodiment of a morphable three-dimensional flowpath 602 comprising a flexible fiber-reinforced ceramic composite 604. The morphable three-dimensional flowpath 602 comprises a continuously morphable cross-section 606 configured to receive an air flow therein. A plurality of actuators (not shown) are coupled to the flexible fiber-reinforced ceramic composite 604 to vary the cross-section 606. For example, in one embodiment, the cross-section is continuously variable from a first cross-section to a second cross-section. FIG. 5 illustrates the morphable three-dimensional flowpath 602 in a deformed configuration comprising a compressed central cross-section 606. The morphable three-dimensional flowpath 602 may be deformed by, for example, morphing end arcs 624 of the flexible fiber-reinforced ceramic composite 604 to compress or expand the central flat section. Those skilled in the art will recognize that the morphable three-dimensional flowpath 602 is variable at any point along the length of the flowpath. A plurality of cooling channels 626 are coupled to cooling ducts 628 formed integrally with the central section of the morphable three-dimensional flowpath 602. In some embodiments, a plurality of transpiration holes 630 are formed in the morphing end arcs 624.

In some embodiments, the maximum change of curvature allowed for a morphable three-dimensional flowpath 602 depends at least on the failure strain of the fiber-reinforced ceramic composite 604, the thickness of the fiber-reinforced ceramic composite 604, and the initial curvature of the morphable three-dimensional structure 602. In one embodiment, the morphable three-dimensional flowpath 602 comprises a ratio of $A^*_{(2)}/A^*_{(1)}$, where $A^*_{(1)}$ is the initial cross-section of the three-dimensional flowpath 602 and $A^*_{(2)}$ is the morphed cross-section. The ratio of the cross-sections is affected by the failure strain, the thickness, and/or the initial curve of the morphable three-dimensional flowpath 602. Shape changes in the morphable three-dimensional flowpath 602 may also generate in-plane shear strains in the fiber-reinforced ceramic composite 604 when the degree of morphing is not uniform along the cross-section.

In some embodiments, the fiber-reinforced ceramic composite 604 comprise one or more lines of discontinuity in a flow-facing side. Achievable morphing of a morphable three-dimensional flowpath 602 may be increased by, for example, including built in capacity for localized rotation and/or localized sliding. Localized rotation can be incorporated by fabricating integrally woven hinge structure in a fiber preform of the fiber-reinforced ceramic composite 604. Localized shear can be incorporated by fabricating a variant of lap joints. In some embodiments, an active cooling system comprising limited flow of coolant through the gaps in the hinges and/or lap joints is incorporated into the three-dimensional flowpath 602.

Figure 6:
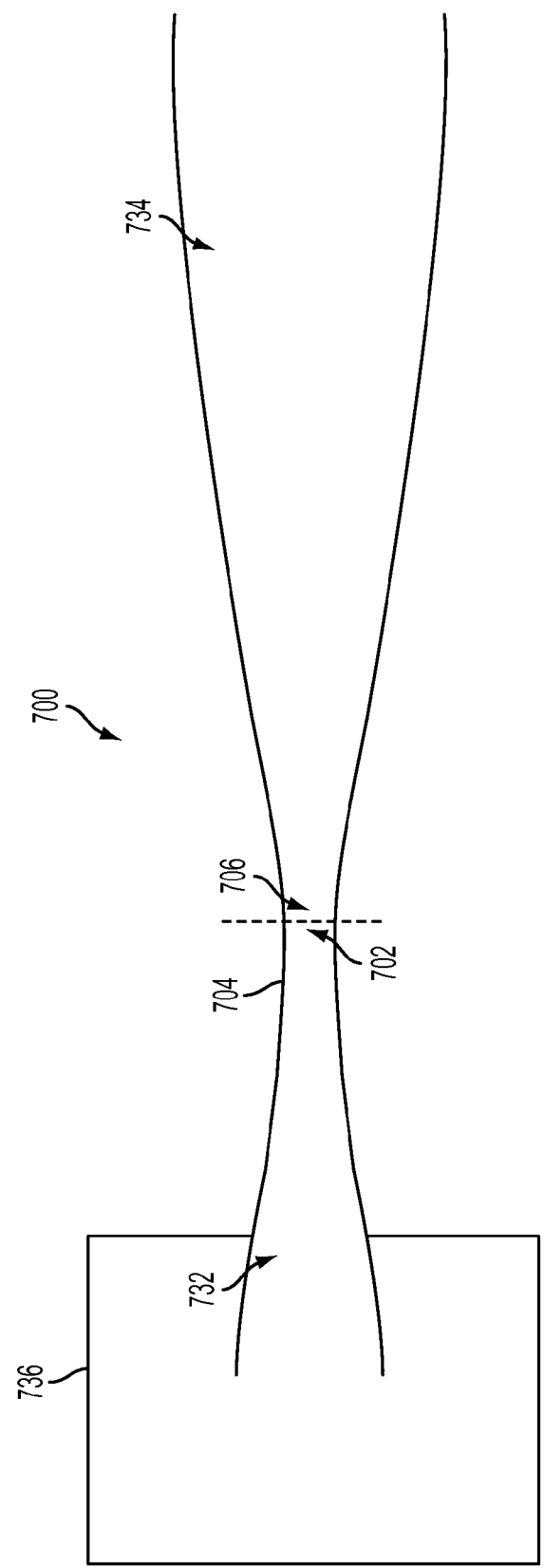
FIG. 6 illustrates one embodiment of a wind tunnel comprising a morphable three-dimensional throat.

FIG. 6 illustrates one embodiment of a wind tunnel 700 comprising a morphable three-dimensional throat 702, a fixed entry section 732 coupled to a first side of the morphable three-dimensional throat 702, and a fixed exit section 734 coupled to a second side of the morphable three-dimensional throat 702. The fixed entry section 732, the morphable three-dimensional throat 702, and the fixed exist section 734 define a flow path. The morphable three-dimensional throat 702 comprises a fiber-reinforced ceramic composite 704. The fiber-reinforced ceramic composite 704 comprises a fiber preform and a ceramic matrix infused therein. An air source 736 is configured to provide air flow from the fixed entry section 732 to the exit section 734. The three-dimensional throat 702 provides a variable cross-section 706. The three-dimensional throat 702 maintains a well-conditioned air flow while varying the flight Mach number within the wind tunnel 700 continuously within a predetermined range, such as, for example, Mach 3-8. The operational Mach range of the wind tunnel 700 is related to the area ratio change of the morphable three-dimensional throat 702. For example, in one embodiment, an area ratio change factor of 12 may allow continuous operation within a range of Mach 3-6. As another example, in one embodiment, an area ratio change factor of 50 enables continuous operation over a range of Mach 3-8. In some embodiments, the three-dimensional throat 702 comprises an asymmetric connection for direct-connect simulation of inlet conditions (see FIG. 12).

The morphable three-dimensional throat 702 is morphable to produce a variable cross-section 706 between the fixed entry section 732 and exit section 734. The morphable three-dimensional throat 702 provides a continuously changeable air speed within the predetermined range. For example, in one embodiment, a morphable three-dimensional throat 702 provides a continuously variable air speed within the range of Mach 3 to Mach 8. In one embodiment, the morphable three-dimensional throat 702 is coupled to one or more actuators configured to continuously morph the cross-section 706 of the three-dimensional throat 702 from a first cross-section to at least a second cross-section. The one or more actuators may comprise, for example, a truss structure coupled to the fiber-reinforced ceramic composite 704 by one or more anchors formed integrally with the fiber-reinforced ceramic composite 704.

The gas temperature and pressure in the morphable three-dimensional throat 702 increases with increasing Mach numbers. In some embodiments, the fiber-reinforced ceramic composite 704 is configured to allow uncooled operation of the wind tunnel 700 up to a predetermined Mach speed having a corresponding temperature. For example, in one embodiment, the fiber-reinforced ceramic composite 704 comprises a SiC fiber weave capable of continued operation at temperatures up to about 1800 K (1500 C), corresponding to Mach numbers up to about Mach 6. For higher Mach numbers, and corresponding higher temperatures, an active cooling system is coupled to the morphable three-dimensional throat 702. For example, in one embodiment, the fiber-reinforced ceramic composite 704 is modified to generate one or more holes and/or ducts within the fiber-reinforced ceramic composite 704 for coupling to an active cooling system. Active cooling systems may comprise, for example, back-face cooling utilizing a cavity filled with a flowing or static gas, a coolant fluid passed through one or more cooling channels attached to and/or formed in the fiber-reinforced ceramic composite 704 (for example in the fiber preform and/or in the ceramic matrix material), and/or transpiration using holes and/or ducts formed in the fiber-reinforced ceramic composite 704. Cooling systems may be selected, for example, based on the heat flux that can be tolerated by the cooling system.

Figure 7:
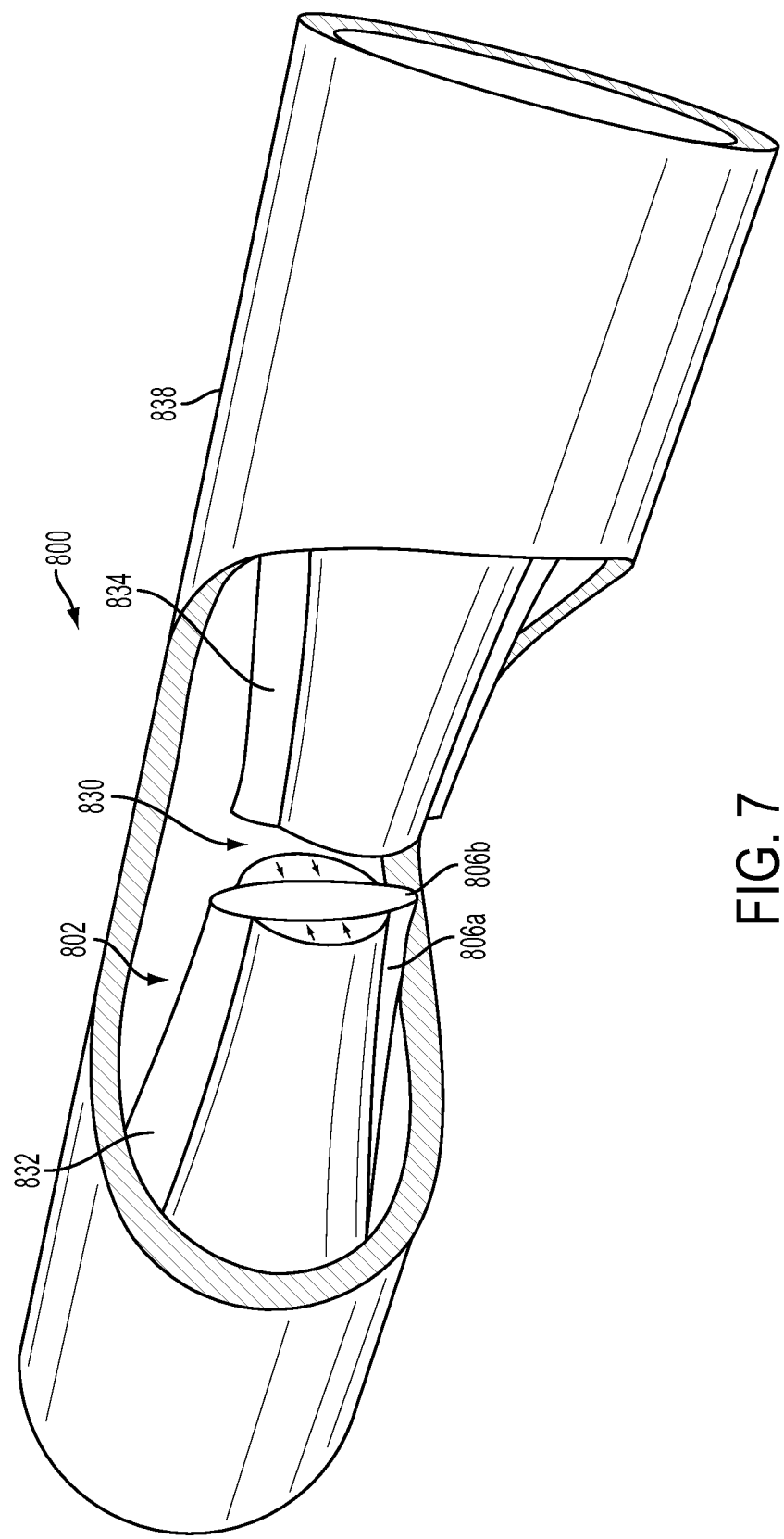
FIG. 7 illustrates one embodiment of a wind tunnel comprising a morphable three-dimensional wind tunnel throat and an outer covering.

FIG. 7 illustrates one embodiment of a hypersonic wind tunnel 800 comprising a morphable three-dimensional throat 802 and an outer containment casing 838. The hypersonic wind tunnel 800 comprises a fixed entry section 832 and exit section 834 coupled by a morphable three-dimensional throat 802. The morphable three-dimensional throat 802 is configured to provide a continuously variable air flow, such as, for example, and air flow variable from Mach 3 to Mach 8. A Mach range of Mach 3 to Mach 8 comprises the transition from turbine engine speeds to RAM engine speeds (Mach 3 to Mach 4) and RAM engine speeds to SCRAM engine speeds (Mach 5 to Mach 6). The transition from Mach 3 to Mach 8 comprises a change in shock angle that requires differing flight vehicle inlet geometry. The hypersonic wind tunnel 800 provides a ground-based testing facility for testing flight vehicle operations over a continuous range of air flow rates, similar to the continuous change experienced by a flight vehicle during operation.

The morphable three-dimensional throat 802 of the hypersonic wind tunnel 800 comprises a cross-section 806. One or more actuators are configured apply a force to the three-dimensional throat 802 to vary the cross-section of the three-dimensional throat 802. For example, in one embodiment, the three-dimensional throat 802 is continuously variable from a first cross-section 806a to second cross-section 806b. The variable cross-section increases the air flow speed, for example from about Mach 3 to about Mach 8, and maintains a smooth air flow during the transition. In the illustrated embodiment, the first cross-section 806a comprises a generally circular cross-section and the second cross-section 806b comprises an oblong cross-section. Those skilled in the art will recognize that the three-dimensional throat 802 may be continuously morphed between a variety of cross-sections and may be varied at any point along the length of the three-dimensional throat 802. The morphable three-dimensional throat 802 eliminates the need for seals used in rectangular slide walls traditionally used to increase air speed in conventional wind tunnel designs. In some embodiments, the three-dimensional throat 802 comprises a ceramic skin 804 configured to allow the wind tunnel 800 to operate at air speeds of up to Mach 6 without active cooling. In some embodiments, a cooling system (not shown) is coupled to the wind tunnel 800 to allow operation above Mach 6, such as, for example, at air speeds up to Mach 8.

In some embodiments, one or more morphable aero appliances are formed within the wind tunnel 800. Aero appliances may comprise, for example, windscreens, diverter surfaces, and/or cusp features. The aero appliances are configured to control the air flow around test articles and test article supports to generate flow fields that properly simulate a flight environment. In some embodiments, the aero appliances are configured to change the cross-section of the wind tunnel 800, for example, to provide a lenticular cross-section. A morphing structure, such as, for example, a morphable aero appliance formed integrally with the morphable tunnel 801, allows optimization of the shape of the aero appliance at the beginning of and/or during testing based on sensor feedback. In embodiments requiring a moving test article, a morphing aero appliance can maintain high flow quality as the flow changes due to the moving test article. In some embodiments, surface jet arrays and/or air bleeding through holes are formed in the fiber preform and/or the ceramic matrix material to provide additional flow optimization. In some embodiments, the wind tunnel 800 may comprise one or more curved plates coupled to one or more side walls. The one or more curved plates are morphable to vary the cross-section of the wind tunnel 800.

The performance of the wind tunnel 800 may be affected by a diffuser section surrounding and following a test article located within the wind tunnel 800. A diffuser section allows pressure recovery and slows the flow from supersonic to subsonic speeds before the air flow enters an ejector. In one embodiment, the diffuser section is shaped to capture flow in such a way that minimum shock losses occur. The diffuser shape determines whether reflected shocks and/or expansion waves from the side walls impinge on the vehicle and cause local heating, aerodynamic loading, and/or other effects. In one embodiment, a diffuser section comprises a morphable fiber-reinforced ceramic composite configured to optimize the recovery pressure for specific test configurations and minimize side wall interactions. Morphing permits the diffuser to be reconfigured on the fly while a test article is performing simulated maneuvers, engine transitions, and/or other testing parameters.

The hypersonic wind tunnel 800 is configured to operate within the limits of the maximum allowable material stress and use temperatures, sustain pressure differentials that vary along one or more axes of the wind tunnel, and/or assume cross-sectional shapes that provide well-conditioned air flow. The maximum change of curvature for the three-dimensional throat 802 depends on the failure strain of the ceramic matrix material, the thickness of the ceramic matrix material, and/or the initial curvature of the three-dimensional throat 802. For example, in one embodiment, the three-dimensional throat 802 comprises an area change ratio of $A^*_{(2)}/A^*_{(1)}$, where $A^*_{(1)}$ is the initial cross-section 806a of the three-dimensional throat 802 and $A^*_{(2)}$ is the morphed cross-section 806b. The ratio may comprise the maximum fractional change achievable in an area reduction of $A_e/A^*$, wherein $A_e$ is the area of the wind tunnel 800 at the exit section 834 and $A^*$ is the current cross-section of the three-dimensional throat 802.

In some embodiments, changing the cross-section of the three-dimensional throat 802 generates in-plane shear strains in the fiber-reinforced ceramic composite when the degree of morphing is not uniform along the flowpath. For example, in one embodiment, the entry section 832 and the exit section 834 are fixed and the three-dimensional throat 802 is morphable. In order to achieve maximum area reduction of the three-dimensional throat 802, the length of three-dimensional throat 802 may be between 1-10 m. In one embodiment, a three-dimensional throat 802 comprises an initial diameter of 340 mm, a wall thickness of 0.75 mm, and a strength of 400 MPa, which can support an internal pressure of 1.8 MPa (18 atm) and therefore can support pressures expected for Mach numbers up to about 4 or 5. For higher Mach numbers and/or larger component diameters, the supporting truss structure (not shown) may be configured to absorb part of the pressure load and/or the pressure load may be at least partially equilibrated by pressurized gas on the non-testing side of the three-dimensional throat 802.

Figure 8:
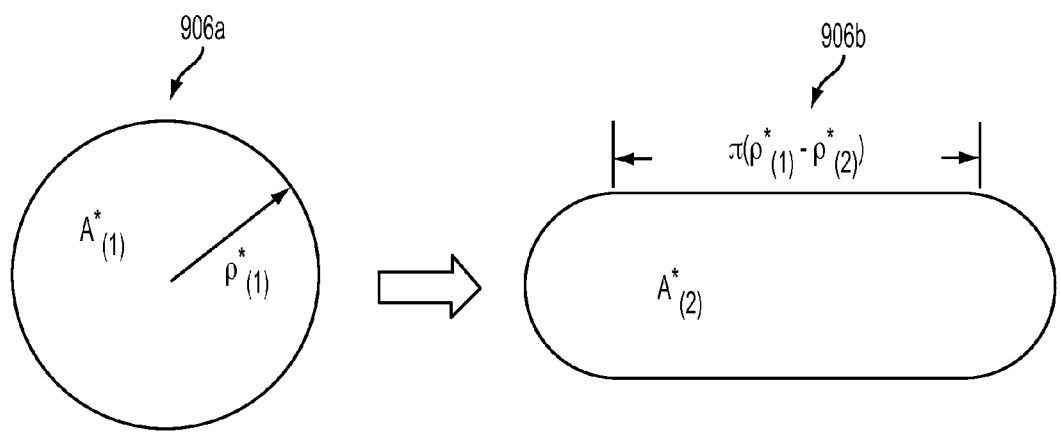
FIGS. 8-11 illustrate various cross-sectional shapes of morphable three-dimensional wind tunnel throats.
Figure 9:
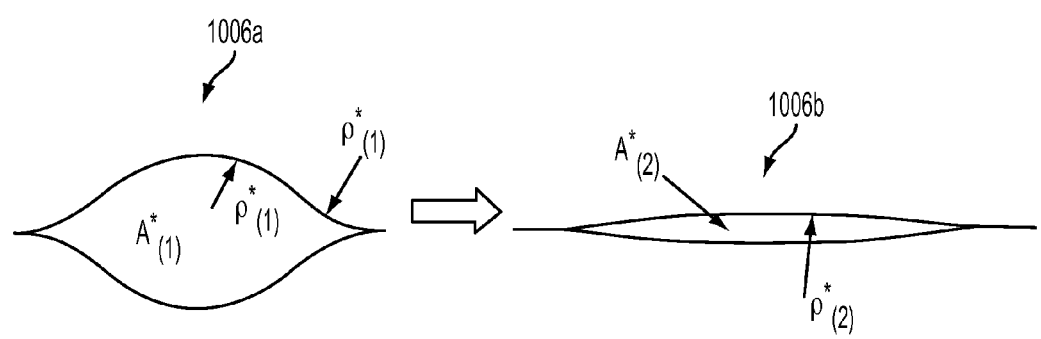
Figure 10:
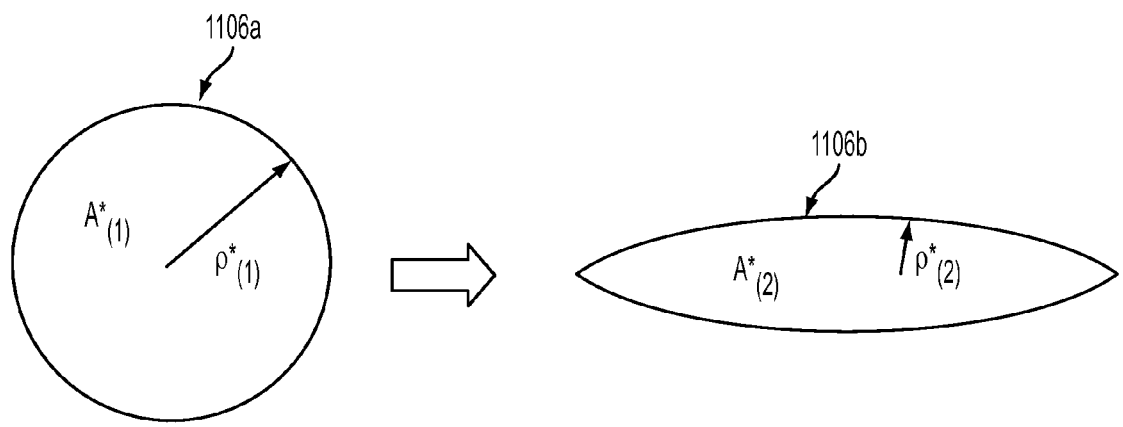
Figure 11:
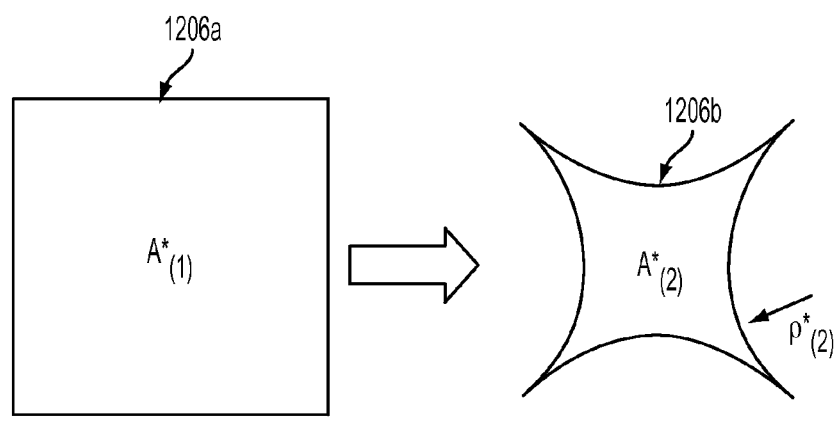

FIGS. 8-11 illustrate various initial and morphed cross-sections suitable for a hypersonic wind tunnel, such as, for example, the hypersonic wind tunnel 800 illustrated in FIG. 7. FIG. 8 illustrates one embodiment of an initial circular cross-section 906a which is morphed into an oval, or racetrack, cross-section 906b. FIG. 9 illustrates an initial eye cross-section 1006a that is morphed into an elongate eye cross-section 1006b. FIG. 10 illustrates an initial circular cross-section 1106a which is morphed into a pointed oval cross-section 1106b. FIG. 11 illustrates an initially square cross-section 1206a which is morphed into a star cross-section 1206b. In one embodiment comprising a failure strain of 0.5%, a skin thickness of 0.7 mm, and an initial cross-sectional width of 340 mm (14 in.), the achievable ratio for each of the cross-sections illustrated in FIGS. 8-11 is: 0.5 for the cross-sections of FIG. 8, 0 for the cross-sections of FIGS. 12 and 13, and <0.1 for the cross-sections of FIG. 11. In some embodiments, such as, for example, the embodiment illustrated in FIG. 8, reaction forces may be required to maintain a flat shape of the morphed cross-section 506b. To avoid critical bending of the ceramic matrix material, actuation loads must be applied via attachment points that are located within a maximum distance, such as, for example, a maximum distance of 5 mm between attachment points.

Figure 12:
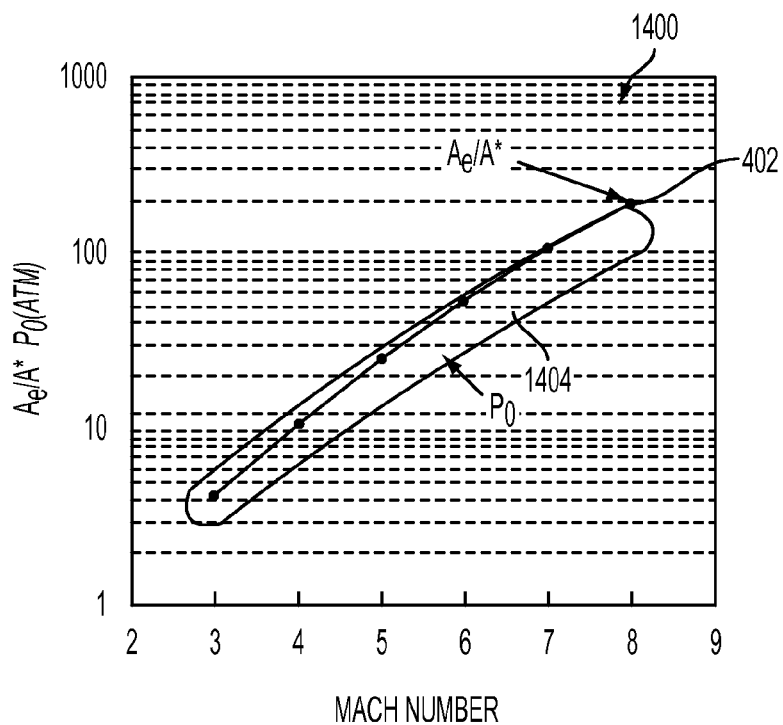
FIG. 12 illustrates a graph of the nozzle ratio and throat pressure of the morphable wind tunnel of FIG. 7 as the Mach speed within the wind tunnel increases.
Figure 13:
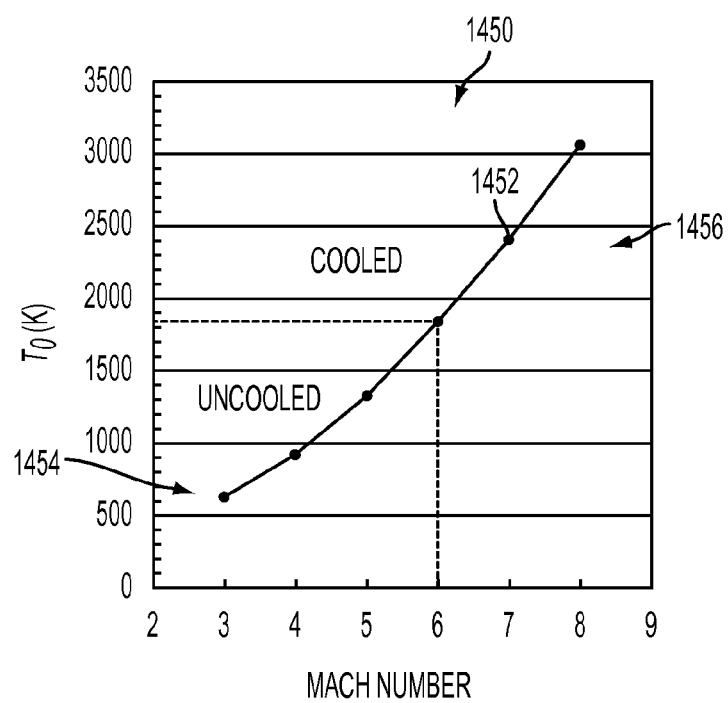
FIG. 13 illustrates a graph of the throat temperature of the morphable wind tunnel of FIG. 7 as the Mach speed within the wind tunnel increases.

FIG. 12 illustrates a graph of the nozzle ratio and throat pressure of a morphable wind tunnel 800 as the Mach speed within the wind tunnel 800 increases. The change in nozzle ratio 1402 increases logarithmically as Mach speed increases. Similarly, the throat pressure 1404 of the morphable three-dimensional throat 802 increases logarithmically as the Mach speed increases. FIG. 13 illustrates a graph of the throat temperature 1452 of a morphable wind tunnel 800 as the Mach speed within the wind tunnel 800 increases. The throat temperature 1452 passes from an uncooled section 1454 indicating temperatures and corresponding Mach speeds in which the morphable three-dimensional throat 802 can operate without cooling into a cooled section 1456 requiring active cooling of the three-dimensional throat 802 at higher Mach numbers.

Figure 14:
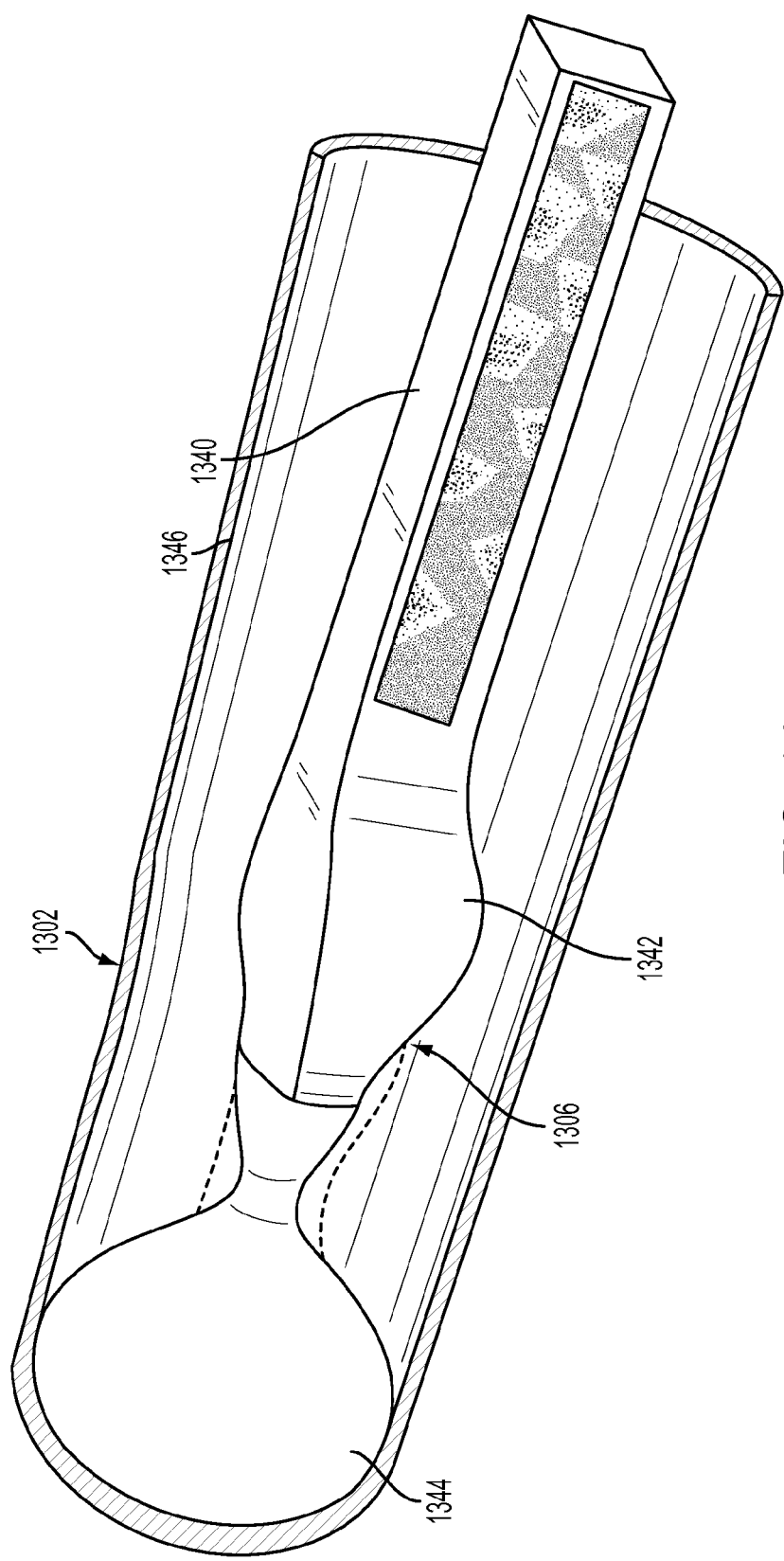
FIG. 14 illustrates one embodiment of a direct-connect wind tunnel comprising a morphable three-dimensional section.

FIG. 14 illustrates one embodiment of a direct-connect wind tunnel 1300. The direct-connect wind tunnel 1300 comprises an asymmetric morphable throat 1302. The asymmetric morphable throat 1302 comprises a fiber-reinforced ceramic composite 1304. The asymmetric morphable throat 1302 is configured to create an asymmetric bulge 1342 to generate controlled shock patterns within a duct 1340. The duct 1340 is configured to directly couple to a test vehicle and/or test vehicle inlet. FIGS. 15A and 15B illustrate the duct 1340 of the direct-connect wind tunnel 1300.

Figure 16:
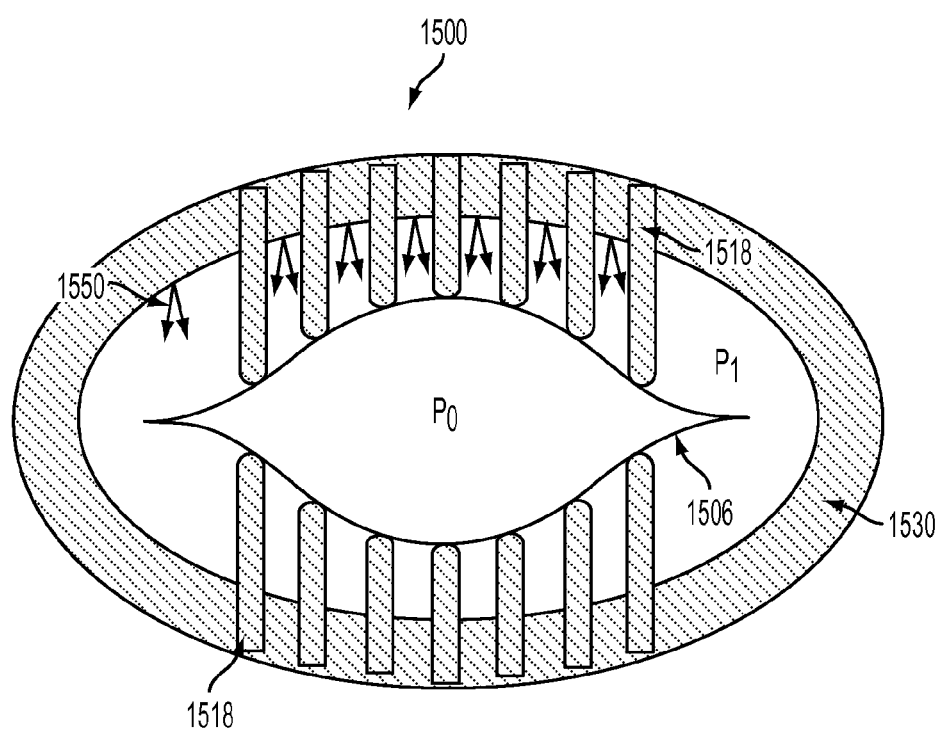
FIG. 16 illustrates a cross-sectional view of one embodiment of a morphable three-dimensional throat comprising back-face cooling into a cavity filled with a gas.

FIG. 16 illustrates a cross-sectional view of a wind tunnel 1500 comprising a morphable three-dimensional throat 1502 and back-face cooling. A plurality of transpiration holes 1530 allow air flow into a cavity 1550 filled with a static and/or flowing gas at a pressure P1. The air flow provides back-face cooling of the morphable three-dimensional throat 1502. A plurality of actuators 1518 extend through the cavity 1550 and are configured to continuously morph the cross-section of the three-dimensional throat 1502.

Figure 17:
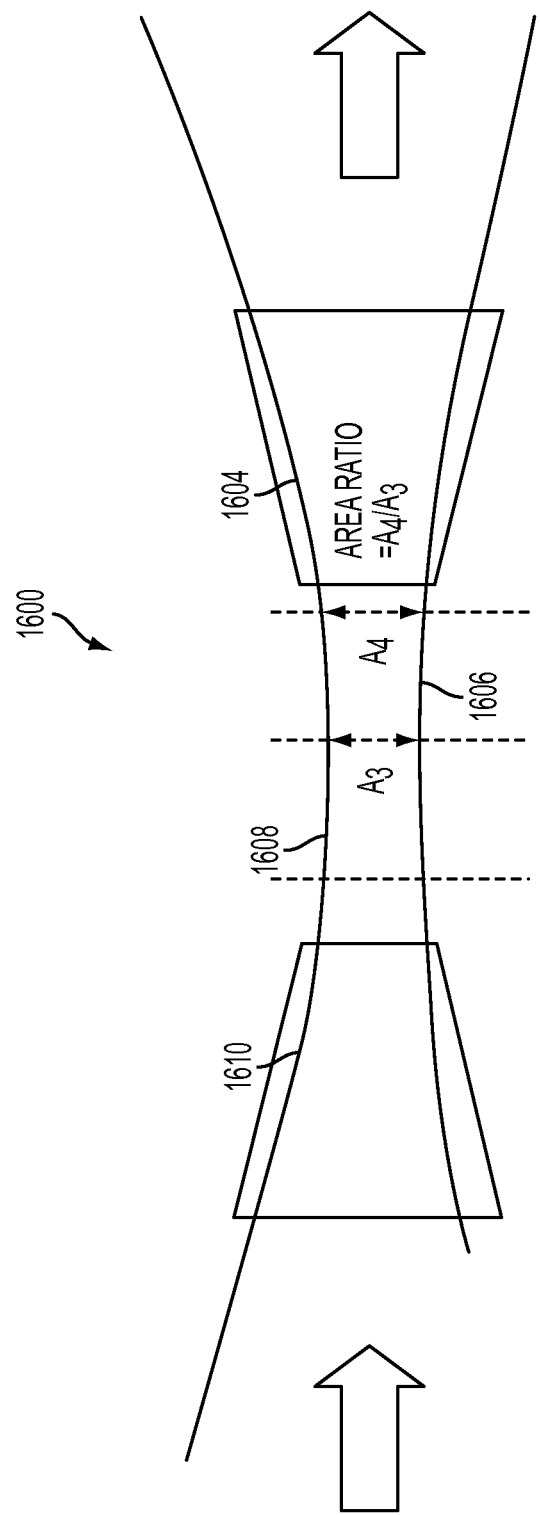
FIG. 17 illustrates one embodiment of a scramjet flowpath comprising one or more morphable-three dimensional sections.

FIG. 17 illustrates one embodiment of a scramjet flowpath 1600 comprising at least one morphable section. The scramjet flowpath 1600 comprises an exhaust nozzle 1602, a combustor section 1606, an isolator section 1608, and an inlet 1610. At least one of the exhaust nozzle 1602, the combustor section 1606, the isolator section 1608, and/or the inlet 1610 comprises a morphable fiber-reinforced ceramic composite. In one embodiment, the scramjet flowpath 1600 comprises a variable three-dimensional exhaust nozzle 1602. The variable three-dimensional exhaust nozzle 1602 comprises a fiber-reinforced ceramic composite. The variable three-dimensional exhaust nozzle 1602 comprises a continuous tube topology. The fiber-reinforced ceramic composite comprises a fiber preform having a ceramic matrix, such as, for example a SiC matrix, infused therein. The fiber preform comprises one or more anchors configured to couple to an actuatable truss structure (not shown). The actuatable truss structure provides one or more forces required to morph the variable three-dimensional exhaust nozzle 1602. The actuatable truss structure is configured to morph the variable three-dimensional exhaust nozzle 1602 in a continuous manner over a variety of exhaust flowpath shapes.

Air breathing hypersonic engines, such as, for example, scramjets, require significant reconfiguration in order to be useful, efficient systems. Supersonic engine systems must transition from a booster, such as a rocket or gas turbine, to a dual-mode ramjet at about Mach 3, and transition again to a scramjet at about Mach 6. Transition between each mode requires changing an inlet contraction ratio from a low ratio to a high ratio. The variable geometry requirement and high temperatures encountered during hypersonic flight are addressed by a morphable three-dimensional flowpath. The change in cross-section of the flowpath may result in a change of acceleration of the vehicle and/or change in direction of the vehicle by controlling the speed and direction of exhaust gas leaving the exhaust.

The generalization of attainable flowpath shapes confers important advantages on a variable three-dimensional exhaust nozzle 1602. Shapes that are restricted to neither rectangular nor circular sections, but can include variable curved sections and sections with variable-angle shallow corners, significantly improve engine performance while still providing adequate hoop strength to contain the flowpath pressure. The variable three-dimensional exhaust nozzle 1602 is configured to support additional flowpath structures, such as, for example, inward turning inlets which require variable contraction ratios for accelerating vehicles.

In some embodiments, the variable three-dimensional exhaust nozzle 1602 is configured to support a continuous transition from Mach 3 to Mach 8. The variable three-dimensional exhaust nozzle 1602 is configured to achieve a 2.5× area reduction in a one meter length inlet. The actuatable truss structure transitions the variable three-dimensional exhaust nozzle 1602 at a rate of at least a 10 cm displacement in less than one second with a positioning accuracy of about 1 mm.

Figure 20:
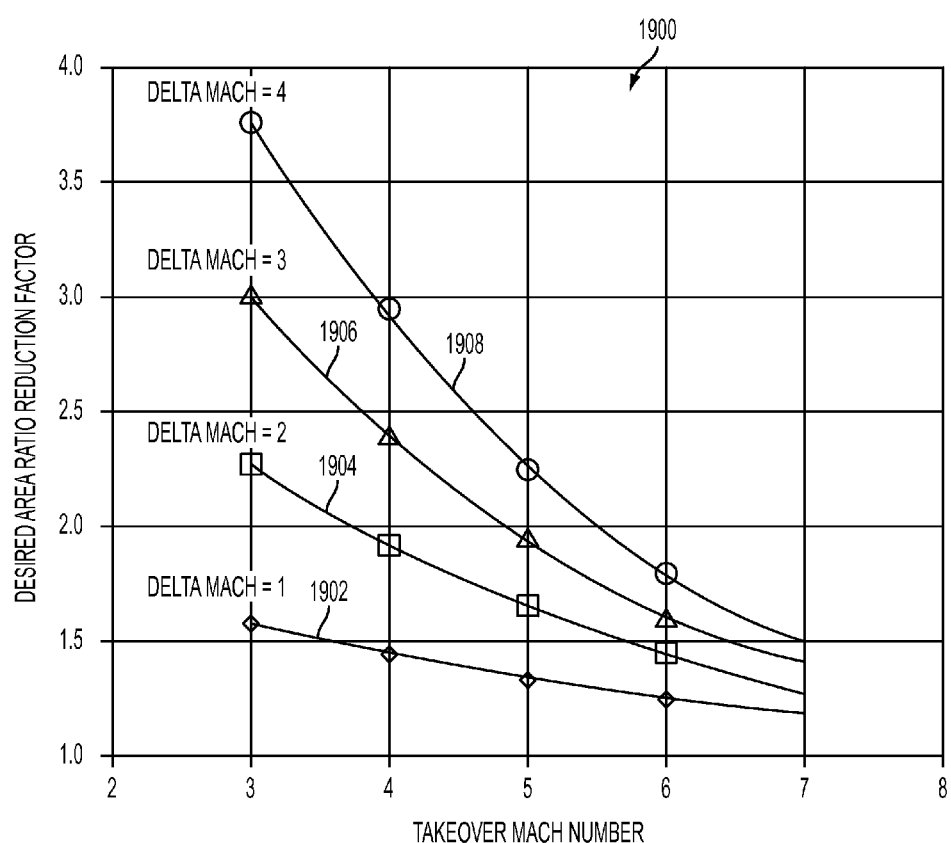
FIG. 20 illustrate a graph of a desired area ratio reduction of an exhaust nozzle as a Mach flight number increases.
Figure 21:
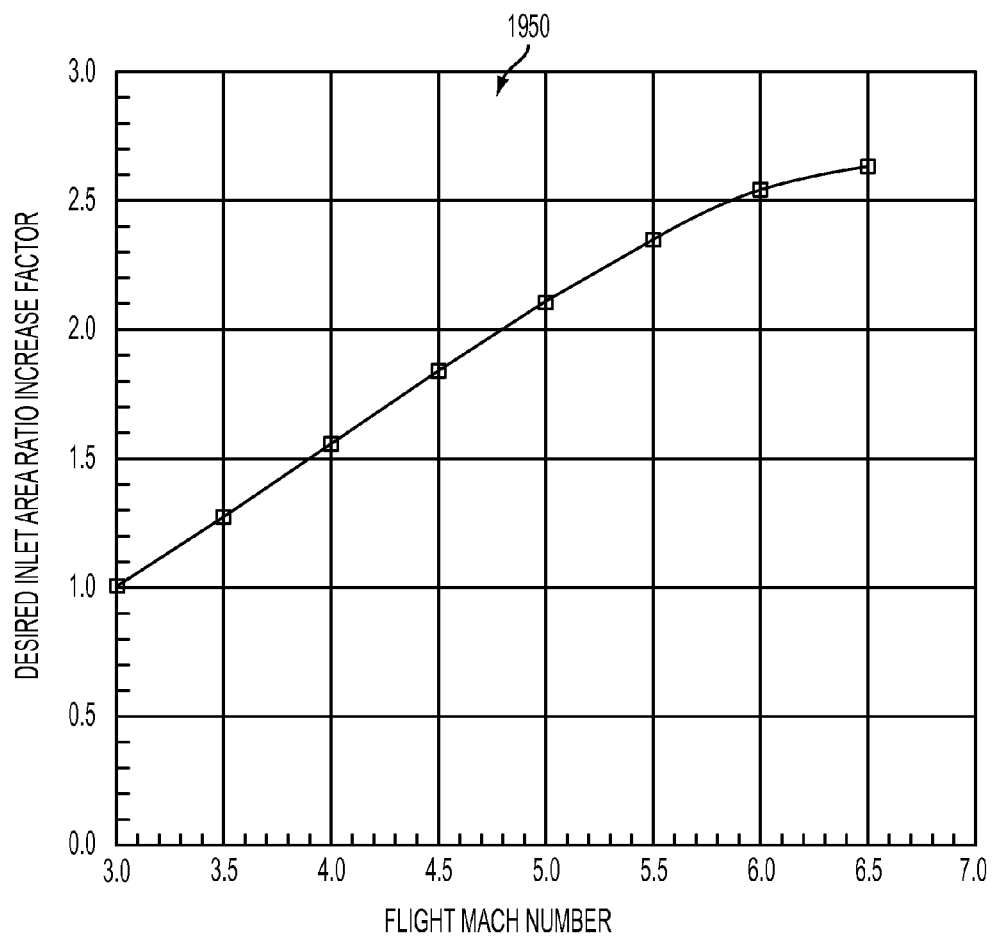
FIG. 21 illustrates a graph of a desired inlet ratio increase factor as a Mach flight number increases.

In some embodiments, the scramjet flowpath 1600 comprises a variable combustion section 1606. The variable combustion section 1606 comprises a variable area ratio. The area ratio measures the ratio of the cross-section of the exit of the combustor section 1606, usually defined as the point where combustion is complete, to the cross-section of the entrance to the combustor section 1606, usually defined as the fuel injection point. The area ratio needed to maintain optimal flight varies as the flight Mach number varies. The desired factor by which the area ratio changes during flight depends on the range of Mach numbers spanned during the operation of a hypersonic engine as well as the Mach number at which the hypersonic engine is fired and takes over from a low-velocity boost system. FIG. 20 is a chart 1900 illustrating area ratio reduction factors 1902-1908 plotted against the takeover Mach number for various Mach number change ranges (the Delta Mach). FIG. 21 is a chart 1950 illustrating a desired inlet area ratio increase factor plotted against a flight Mach number.

In some embodiments comprising a variable combustion section 1606, the other sections along the flowpath comprise limited or no variability. In other embodiments, one or more additional sections, such as, for example, an exhaust nozzle section 1604, comprise a morphable ceramic matrix material. A gradient in morphing along the axis of the flowpath may be maintained within the morphable exhaust system 1600. In some embodiments, the morphable exhaust system 1600 comprises a continuously morphable flowpath without clearly defined combustion 1606, exhaust 1604, isolator 1608, inlet 1610, and/or other sections. For example, at high Mach numbers, the need for an isolator 1608 between the inlet 1610 and the combustor 1606 diminishes while the optimal length of the exhaust nozzle 1604 increases. The morphable exhaust system 1600 may be configured to morph what was an isolator 1608 at low Mach numbers to become a combustor 1606 at high Mach numbers and to morph what was a combustor 1606 at a low Mach number to a portion of the exhaust nozzle 1604 at high Mach numbers.

A morphable exhaust system 1600 comprising one or more variable sections having continuously morphable unbroken walls provides significant advantages over traditional rectangular exhaust systems. For example, the morphable exhaust system 1600 eliminates or reduces corner flow resulting in lower inlet distortion, increased inlet efficient, and improved operability margin by mitigating adverse gradients resulting from shockwave-boundary layer interactions within the inlet. The morphable exhaust system 1600 further eliminates seal hardware and pressurization equipment necessary to prevent leakage of air from the flow path, resulting in reduced hardware and lower vehicle weight. The morphable exhaust system 1600 reduces the number of separate injector stations required to tailor the combustor to varying Mach numbers. Without the ability to physically change the combustor area ratio, scramjet combustors rely on multiple, independent fuel injection sites to effectively change the area ratio by translating the zone of combustion along the flowpath. A variable combustion section 1606 achieves the same effect as multiple fuel injection sites utilizing a single fuel injection station by redefining the combustor 1606 zone by shape morphing, substantially reducing the weight and complexity of a fuel system.

The use of a fiber-reinforced ceramic composite and a structurally efficient actuating truss reduces the weight of the scramjet flowpath 1600 over traditional systems utilizing metal alloys. For example, in one embodiment, utilizing a fiber-reinforced ceramic composite with one quarter of the density of traditional metal alloys, the weight of the exhaust system 1600 is reduced by at least a factor of five. The fiber-reinforced ceramic composite provides a higher temperature limit than traditional metal alloys, allowing substantial reductions in cooling requirements. Reducing the cooling requirements provides further advantages to structural weight and may eliminate the need for cooling in some flowpath segments entirely.

The fiber-reinforced ceramic composite provides a low heat flux into the structure of a vehicle, resulting in lower cooling requirements. In long-duration hypersonic flights, or cruising, fuel available for cooling is limited. The use of a fiber-reinforced ceramic composite reduces the cooling requirements and increases fuels available for flight. In some embodiments, one or more cooling systems are coupled to the morphable exhaust system 1600 such as, for example, ablative materials, active cooling, and/or transpiration. In some embodiments, feedback from engine parameters such as, for example, wall temperatures or pressure, is used to enable fine adjustment of the morphable exhaust system 1600, such as inlet conditions to maintain engine optimality and avoid issues such as, for example, inlet unstart.

Figure 18A:
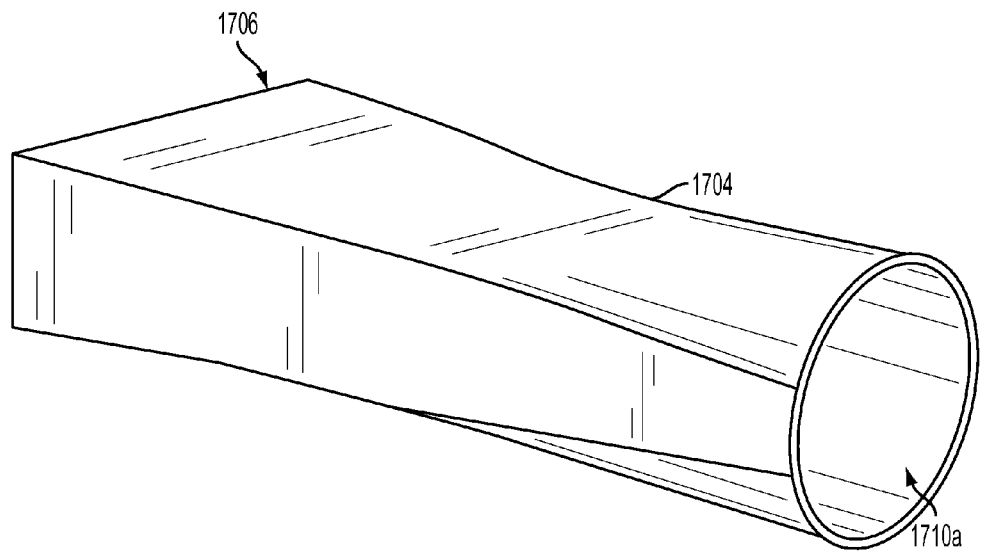
FIGS. 18A and 18B illustrates one embodiment of a morphable three-dimensional exhaust nozzle.
Figure 18B:
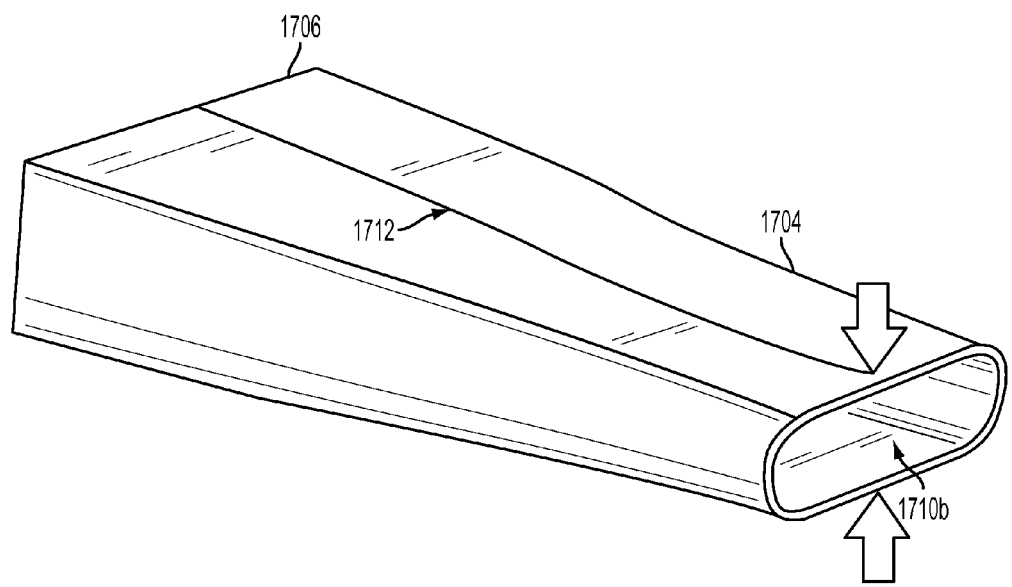

FIGS. 18A and 18B illustrate one embodiment of a morphable exhaust system 1700 comprising a variable three-dimensional nozzle 1704. The variable three-dimensional nozzle 1704 comprises a fiber-reinforced ceramic composite. A truss structure (not shown) is coupled to the variable three-dimensional nozzle 1704 by, for example, a plurality of fiber anchors woven integrally with and extending through the cold-side of the fiber-reinforced ceramic composite. The truss structure is coupled to a plurality of actuators 714. The plurality of actuators are configured to apply a morphing force to the variable three-dimensional nozzle 1704 to continuously vary the cross-section of the three-dimensional nozzle 1704. For example, in one embodiment, the three-dimensional nozzle 1704 may be continuously varied from a first cross-section 1710a to a second cross-section 1710b.

In some embodiments, changing the cross-section 1710 of the variable three-dimensional nozzle 1704 does not affect other sections of the exhaust system 1700 within the morphable exhaust system 1700. In some embodiments, a morphing gradient 1712 along the axis of the flowpath is implemented to limit the effects of the variable three-dimensional nozzle 1704 on other sections of the flowpath.

Figure 19:
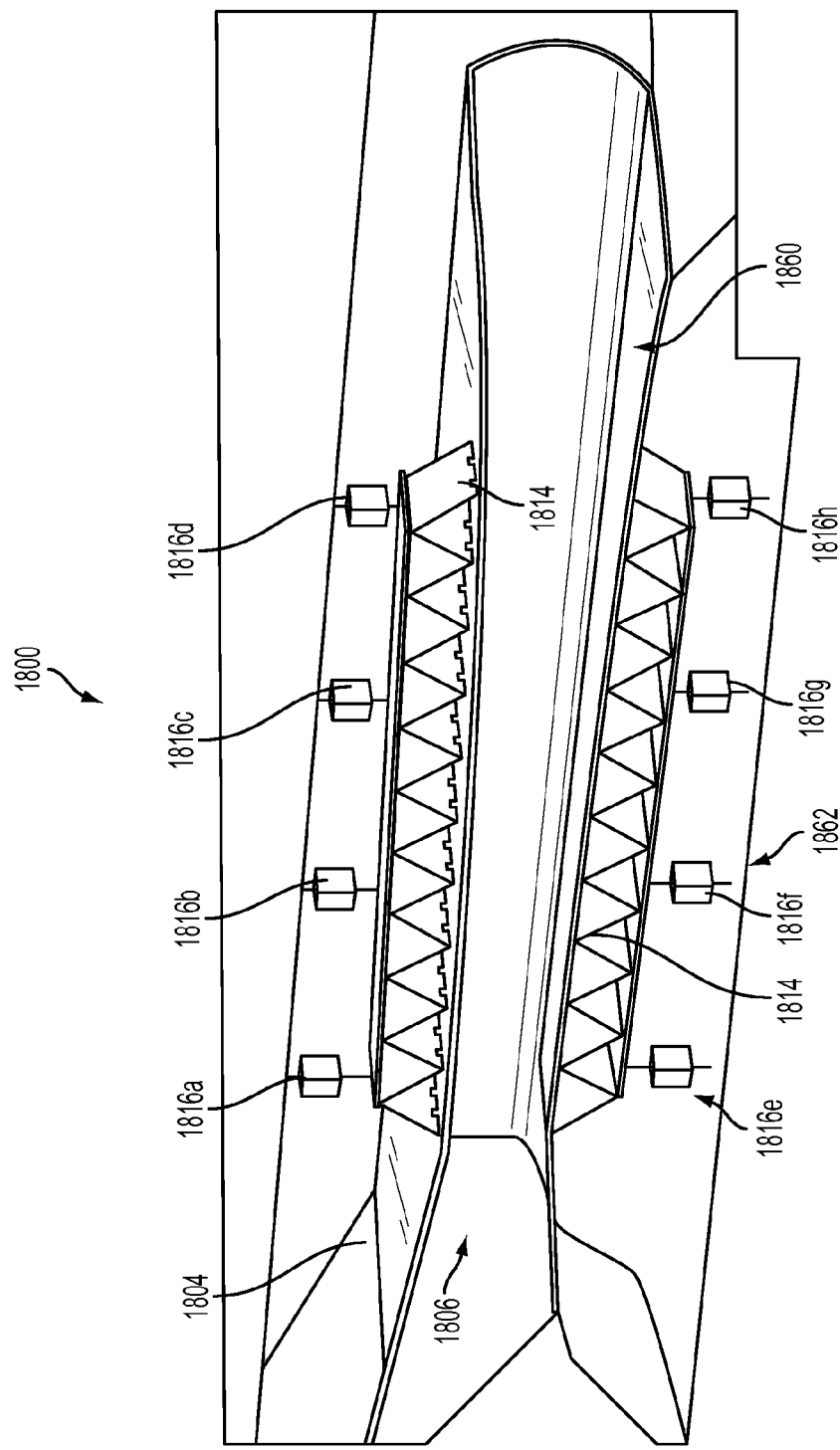
FIG. 19 illustrates one embodiment of a morphable three-dimensional exhaust system configured to provide at least a 2× inlet reduction.

FIG. 19 illustrates one embodiment of a morphable three-dimensional inlet 1800 comprising a variable cross-section 1806. The morphable three-dimensional inlet 1800 comprises a flexible fiber-reinforced ceramic composite 1804. The fiber-reinforced ceramic composite 1804 comprises a fiber preform and a ceramic matrix material infused therein. The fiber-reinforced ceramic composite 1804 is coupled to a truss structure 1814 and a plurality of actuators 1816a-1816h. The plurality of actuators 1816a-1816h are configured to continuously vary the cross-section 1806 of the inlet 1800. In some embodiments, the inlet 1800 is configured to achieve a two-times inlet reduction over a range of, for example, Mach 3 to Mach 5. The plurality of actuators 1816a-1816h are coupled to a cold support structure 1862. FIG. 20 illustrates a graph of a desired area ratio reduction of an exhaust nozzle as a Mach flight number increases. FIG. 21 illustrates a graph of a desired inlet ratio increase factor as a Mach flight number increases.

Figure 22:
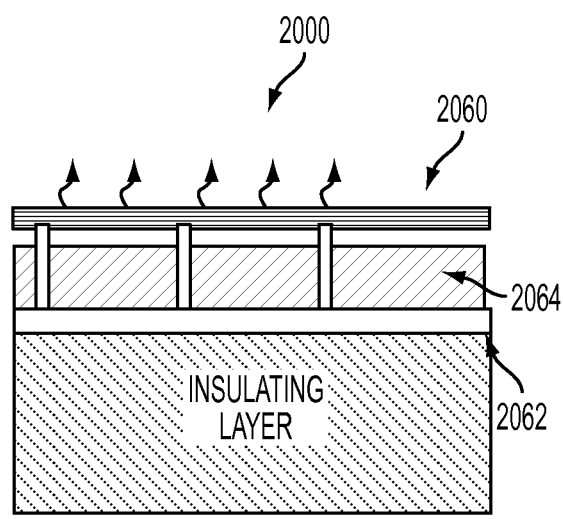
FIG. 22 illustrates one embodiment of a morphable ceramic matrix sandwich structure comprising a self-transpiring skin housing an ablative material.

FIG. 22 illustrates one embodiment of a fiber-reinforced ceramic composite 2000 suitable for use in a morphable three-dimensional exhaust system, such as, for example, the exhaust system 1600 illustrated in FIG. 17. In some embodiments, the fiber-reinforced ceramic composite 2000 comprises a ceramic textile sandwich comprising a first skin layer 2060 facing a high heat flux, such as, for example, the exhaust flow path. The first skin layer 2060 is porous. An ablative material 2064 configured to sublime and transpire through the porous first skin 2060 is sandwiched between the first skin 2060 and a second, non-porous skin 2062. The self-transpiring sandwich 2000 can sustain very high heat fluxes without active cooling for extended periods, such as, for example, theater missile flight durations. The first skin 2060 maintains geometrical integrity while the ablative material 2064 sublimes and provides thermal protection. By selecting the sandwich architecture and subliming material, high shear deformation over any plan containing the through-thickness direction is possible.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The appended claims are intended to cover all such modification and variations.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

Various aspects of the subject matter described herein are set out in the following numbered clauses:

1. A morphable composite three-dimensional structure, comprising: a flexible fiber-reinforced ceramic composite, comprising: a fiber preform having a plurality of anchors integrally formed therein; and a flexible ceramic matrix infused within the fiber preform, wherein the plurality of anchors extend through a thickness of the flexible ceramic matrix; wherein the fiber-reinforced ceramic composite defines a three-dimensional flowpath having a cross-section, wherein the cross-section is variable along the length of the flowpath, wherein the plurality of anchors are configured to couple to at least one actuator, and wherein at least one actuator is actuatable to vary the cross-section of the flowpath.

2. The morphable composite three-dimensional structure of clause 1, wherein the three-dimensional flowpath is variable between at least a first cross-section and a second cross-section.

3. The morphable composite three-dimensional structure of clause 2, wherein the first cross-section comprises a generally circular cross-section.

4. The morphable composite three-dimensional structure of clause 3, wherein the second cross-section comprises a generally elliptical cross-section.

5. The morphable composite three-dimensional structure of clause 1, wherein the three-dimensional flowpath comprises a wind tunnel throat.

6. The morphable composite three-dimensional structure of clause 1, wherein the fiber-reinforced ceramic composite comprises one or more cusp features.

7. The morphable composite three-dimensional structure of clause 6, wherein the cusp features define a lenticular cross-section.

8. The morphable composite three-dimensional structure of clause 1, wherein the fiber-reinforced ceramic composite comprises one or more curved sheets.

9. The morphable composite three-dimensional structure of clause 8, comprising one or more side walls, wherein the one or more curved sheets abut the one or more sidewalls, and wherein the one or more side walls and the one or more curved sheets define the three-dimensional flowpath.

10. The morphable composite three-dimensional structure of clause 1, wherein the three-dimensional flowpath comprises an exhaust system.

11. The morphable composite three-dimensional structure of clause 1, wherein the at least one actuator is configured to apply a pulling force.

12. The morphable composite three-dimensional structure of clause 1, wherein the at least one actuator is configured to apply a pushing force.

13. The morphable composite three-dimensional structure of clause 1, wherein the ceramic matrix comprises a thickness of about 1.0 millimeters.

14. An apparatus comprising: a flexible fiber-reinforced ceramic composite, comprising: a fiber preform having a plurality of anchors integrally formed therein; and a ceramic matrix infused within the fiber preform, wherein the plurality of anchors extend through a thickness of the flexible ceramic matrix; wherein the flexible fiber-reinforced ceramic composite defines a three-dimensional flowpath having a cross-section, wherein the cross-section is variable along the length of the flowpath; and at least one actuator coupled to the plurality of anchors, wherein the at least one actuator is actuatable to vary the cross-section of the flowpath.

15. The apparatus of clause 14, wherein the three-dimensional flowpath comprises a wind tunnel throat.

16. The apparatus of clause 15, wherein the wind tunnel throat is configured to receive an air flow from an air source, and wherein varying the cross-section of the flowpath corresponds to a change in a speed of the air flow.

17. The apparatus of clause 14, wherein the three-dimensional flowpath comprises an exhaust system.

18. A variable speed wind tunnel comprising: an entry section configured to couple to an air source; an exit section comprising a testing section; and a morphable three-dimensional throat coupling the entry path and the exit path, wherein the morphable three-dimensional throat is configured to provide a continuously variable air flow speed from the entry section to the exit section, and wherein the morphable three-dimensional throat comprises: a flexible fiber-reinforced ceramic composite, comprising: a fiber preform having a plurality of anchors integrally formed therein; and a ceramic matrix infused within the fiber preform, wherein the plurality of anchors extend through a thickness of the flexible ceramic matrix; wherein the flexible fiber-reinforced ceramic composite defines a three-dimensional flowpath having a cross-section, and wherein the cross-section is variable along the length of the flowpath; and at least one actuator coupled to the plurality of anchors, wherein the at least one actuator is actuatable to vary the cross-section of the flowpath.

19. The variable speed wind tunnel of clause 18, comprising an outer casing disposed over the entry path, the exit path, and the morphable three-dimensional throat.

20. The variable speed wind tunnel of clause 18, wherein the morphable three-dimensional throat provides a continuously changing air flow speed from a first speed to a second speed.

21. The variable speed wind tunnel of clause 20, wherein the first speed is about Mach 3 and the second speed is about Mach 8.

22. The variable speed wind tunnel of clause 21, wherein the entry section, the morphable three-dimensional throat, and the exit section comprise an hour-glass shape.

What is claimed is:

1. A morphable composite three-dimensional structure, comprising:
   a flexible fiber-reinforced ceramic composite, comprising:
      a fiber preform having a plurality of anchors integrally formed therein; and
      a ceramic matrix infused within the fiber preform, wherein the plurality of anchors extend through a thickness of the flexible ceramic matrix;
   wherein the flexible fiber-reinforced ceramic composite defines a three-dimensional flowpath having a cross-section, wherein the cross-section is variable along the length of the flowpath, wherein the plurality of anchors are configured to couple to at least one actuator, and wherein at least one actuator is actuatable to vary the cross-section of the flowpath.

2. The morphable composite three-dimensional structure of claim 1, wherein the three-dimensional flowpath is variable between at least a first cross-section and a second cross-section.

3. The morphable composite three-dimensional structure of claim 2, wherein the first cross-section comprises a generally circular cross-section.

4. The morphable composite three-dimensional structure of claim 3, wherein the second cross-section comprises a generally elliptical cross-section.

5. The morphable composite three-dimensional structure of claim 1, wherein the three-dimensional flowpath comprises a wind tunnel throat.

6. The morphable composite three-dimensional structure of claim 1, wherein the fiber-reinforced ceramic composite comprises one or more cusp features.

7. The morphable composite three-dimensional structure of claim 6, wherein the cusp features define a lenticular cross-section.

8. The morphable composite three-dimensional structure of claim 1, wherein the fiber-reinforced ceramic composite comprises one or more curved sheets.

9. The morphable composite three-dimensional structure of claim 8, comprising one or more side walls, wherein the one or more curved sheets abut the one or more sidewalls, and wherein the one or more side walls and the one or more curved sheets define the three-dimensional flowpath.

10. The morphable composite three-dimensional structure of claim 1, wherein the three-dimensional flowpath comprises an exhaust system.

11. The morphable composite three-dimensional structure of claim 1, wherein the at least one actuator is configured to apply a pulling force.

12. The morphable composite three-dimensional structure of claim 1, wherein the at least one actuator is configured to apply a pushing force.

13. The morphable composite three-dimensional structure of claim 1, wherein the ceramic matrix comprises a thickness of about 1.0 millimeters.

14. An apparatus comprising:
   a flexible fiber-reinforced ceramic composite, comprising:
      a fiber preform having a plurality of anchors integrally formed therein; and
      a ceramic matrix infused within the fiber preform, wherein the plurality of anchors extend through a thickness of the flexible ceramic matrix;
   wherein the flexible fiber-reinforced ceramic composite defines a three-dimensional flowpath having a cross-section, wherein the cross-section is variable along the length of the flowpath; and
   at least one actuator coupled to the plurality of anchors, wherein the at least one actuator is actuatable to vary the cross-section of the flowpath.

15. The apparatus of claim 14, wherein the three-dimensional flowpath comprises a wind tunnel throat.

16. The apparatus of claim 15, wherein the wind tunnel throat is configured to receive an air flow from an air source, and wherein varying the cross-section of the flowpath corresponds to a change in a speed of the air flow.

17. The apparatus of claim 14, wherein the three-dimensional flowpath comprises an exhaust system.

18. A variable speed wind tunnel comprising:
   an entry section configured to couple to an air source;
   an exit section comprising a testing section; and
   a morphable three-dimensional throat coupling the entry path and the exit path, wherein the morphable three-dimensional throat is configured to provide a continuously variable air flow speed from the entry section to the exit section, and wherein the morphable three-dimensional throat comprises:
      a flexible fiber-reinforced ceramic composite, comprising:
         a fiber preform having a plurality of anchors integrally formed therein; and
         a ceramic matrix infused within the fiber preform, wherein the plurality of anchors extend through a thickness of the flexible ceramic matrix;
      wherein the flexible fiber-reinforced ceramic composite defines a three-dimensional flowpath having a cross-section, and wherein the cross-section is variable along the length of the flowpath; and
      at least one actuator coupled to the plurality of anchors, wherein the at least one actuator is actuatable to vary the cross-section of the flowpath.

19. The variable speed wind tunnel of claim 18, comprising an outer casing disposed over the entry path, the exit path, and the morphable three-dimensional throat.

20. The variable speed wind tunnel of claim 18, wherein the morphable three-dimensional throat provides a continuously changing air flow speed from a first speed to a second speed.

21. The variable speed wind tunnel of claim 20, wherein the first speed is about Mach 3 and the second speed is about Mach 8.

22. The variable speed wind tunnel of claim 21, wherein the entry section, the morphable three-dimensional throat, and the exit section comprise an hour-glass shape.

\* \* \* \* \*